United States Patent [19]

Hoppe, Jr.

[11] E Re. 31,132

[45] Reissued Jan. 25, 1983

Best Available Copy

[54] ELECTRICAL CONNECTOR AND INSULATION-PIERCING CONTACT MEMBER

[75] Inventor: Paul P. Hoppe, Jr., Arlington Heights, Ill.

[73] Assignee: Bunker Ramo Corporation, Oak Brook, Ill.

[21] Appl. No.: 769,106

[22] Filed: Feb. 16, 1977

Related U.S. Patent Documents

Reissue of:

[64] Patent No.: 3,926,498
Issued: Dec. 16, 1975
Appl. No.: 288,998
Filed: Sep. 14, 1972

[51] Int. Cl.[3] ..... H01R 9/00; H01R 13/58

[52] U.S. Cl. ..... 339/97 R; 339/103 R

[58] Field of Search ..... 339/95–99, 339/103, 176, 223

[56] References Cited

U.S. PATENT DOCUMENTS

| | | | |
|---|---|---|---|
| 2,333,266 | 11/1943 | Miller | 339/97 P |
| 2,742,549 | 4/1956 | Peters | 339/97 P X |
| 2,938,190 | 5/1960 | Krehbiel | 339/176 M |
| 3,002,176 | 9/1961 | Yopp | 339/176 M |
| 3,167,375 | 1/1965 | Sarazen | 339/99 P |
| 3,227,991 | 1/1966 | Zdanis | 339/98 |
| 3,320,354 | 5/1967 | Marley et al. | 339/98 X |
| 3,388,367 | 6/1968 | Brown | 339/97 P X |
| 3,566,338 | 2/1971 | Stantin | 339/186 T |
| 3,582,863 | 6/1971 | Hoffman | 339/59 M |
| 3,609,642 | 9/1971 | Norden | 339/95 D |
| 3,611,263 | 10/1971 | Knone et al. | 339/97 R |
| 3,657,682 | 4/1972 | Iverson | 339/97 R |
| 3,718,888 | 2/1973 | Pasternak | 339/98 |
| 3,760,331 | 9/1973 | Gurley | 339/97 P |
| 3,760,335 | 9/1973 | Roberts | 339/99 R |
| 3,761,868 | 9/1973 | Krone et al. | 339/98 |
| 3,778,750 | 12/1973 | Caveney et al. | 399/97 R |

FOREIGN PATENT DOCUMENTS

| | | | |
|---|---|---|---|
| 728795 | 2/1966 | Canada | 339/176 M |
| 1963789 | 6/1971 | Fed. Rep. of Germany | 339/98 |
| 2040805 | 2/1972 | Fed. Rep. of Germany | 339/97 R |
| 7212035 | 6/1972 | Fed. Rep. of Germany | 339/97 R |
| 1377374 | 2/1965 | France | 339/97 P |
| 67298 | 2/1951 | Netherlands | 339/97 R |
| 615737 | 1/1949 | United Kingdom | 339/95 R |
| 635943 | 4/1950 | United Kingdom | 339/97 R |

OTHER PUBLICATIONS

Lueger Lexikon Der Technik.

*Primary Examiner*—Joseph H. McGlynn
*Attorney, Agent, or Firm*—F. M. Arbuckle

[57] ABSTRACT

An electrical connector comprising two dielectric contact mounts, one a plug and the other a receptacle, fitting together to engage a plurality of conductive contact members carried by one contact mount with similar contact members mounted in the other. Each contact member is formed from a single piece of thin, conductive sheet metal, with a contact element at one end and a terminal element at the other; the terminal element is channel-shaped with two terminal flanges each struck from a channel wall and bent across the channel, preferably into interlocking relation with another channel wall. Each terminal flange has a notch with thin converging walls affording a cutting section to cut the insulation on a conductor inserted into the notch, a transition section with tapered walls to spread the insulation, and a terminal section with thick, smooth walls to engage the conductor in wiping electrical contact. The contact mounts include resilient retention slots for holding the electrical conductors in the terminal elements of the contact members.

41 Claims, 21 Drawing Figures

FIG.1
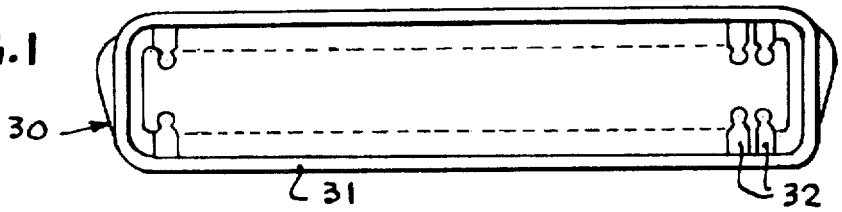
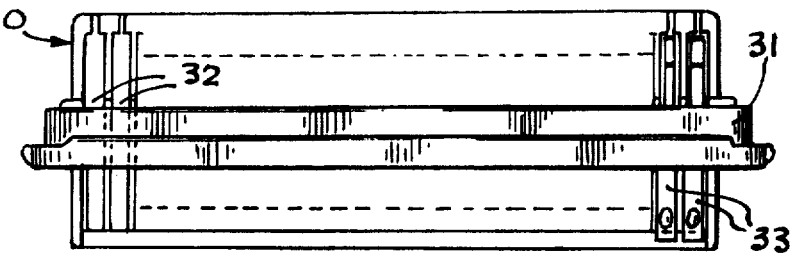
FIG.2
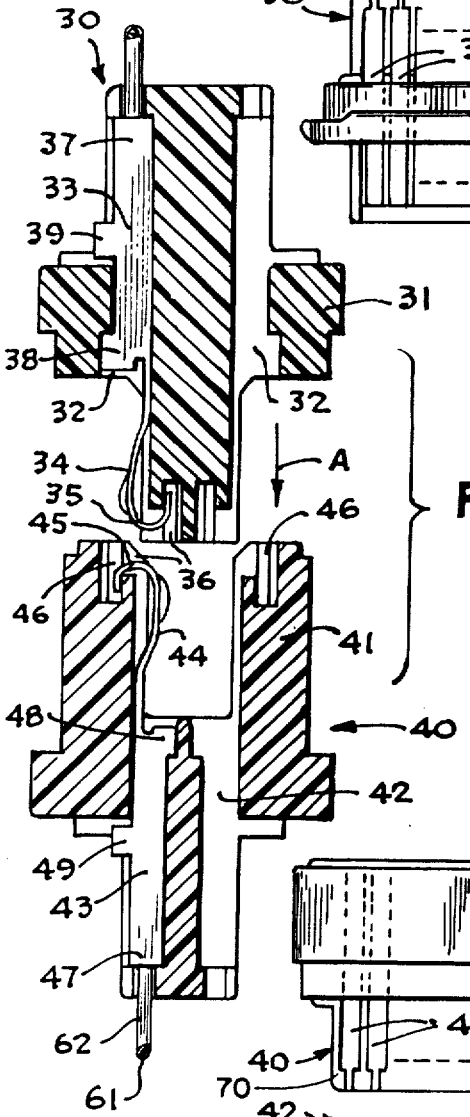
FIG.5
FIG.3
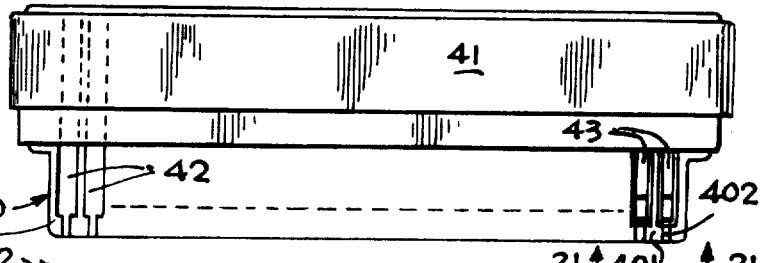
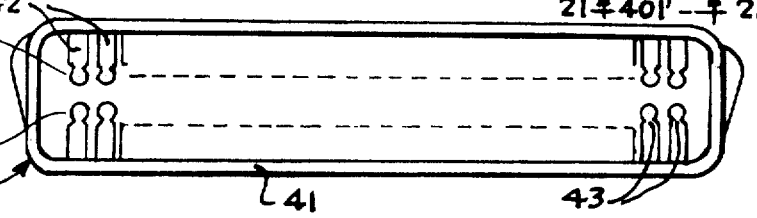
FIG.4

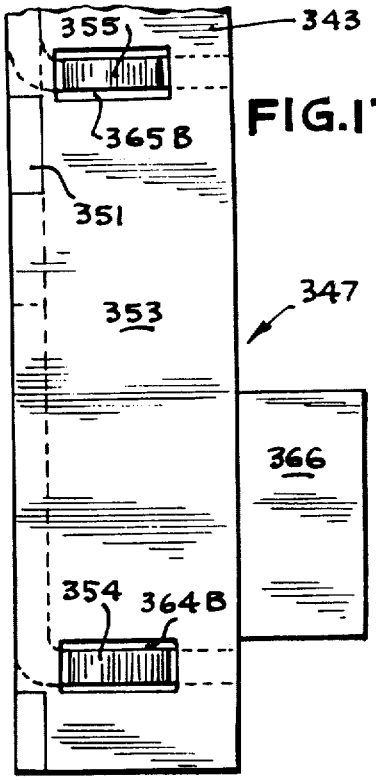
FIG.17
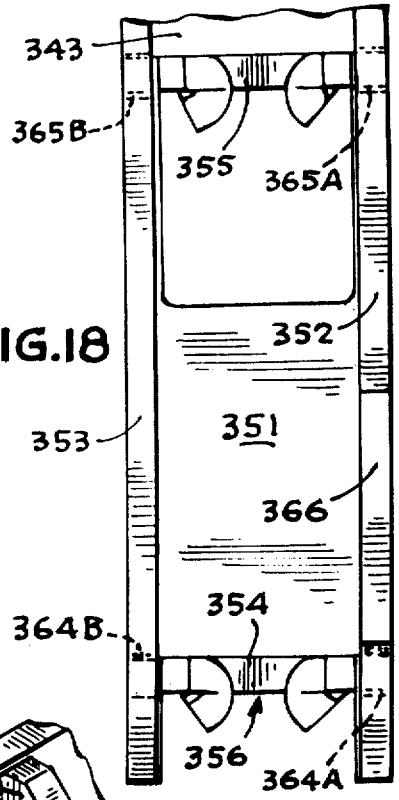
FIG.18
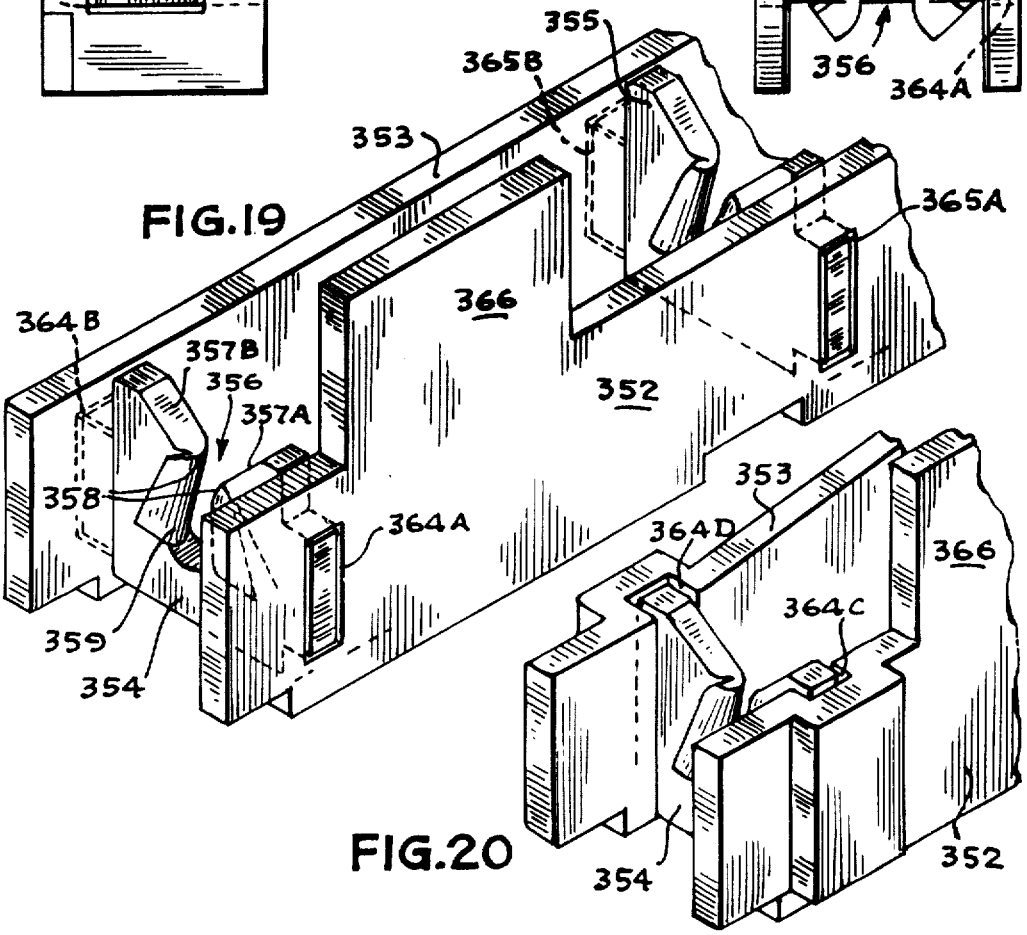
FIG.19
FIG.20

ELECTRICAL CONNECTOR AND INSULATION-PIERCING CONTACT MEMBER

Matter enclosed in heavy brackets [ ] appears in the original patent but forms no part of this reissue specification; matter printed in italics indicates the additions made by reissue.

BACKGROUND OF THE INVENTION

In multi-circuit electrical connectors, of the kind used in great variety and numbers in communication systems and other data handling systems, the usual technique for connecting the individual solid or stranded wire conductors to the connector has been to strip the insulation from the end of the conductor and then solder the conductor to a connector contact. This procedure requires considerable skill on the part of the workman making the solder connection, particularly in miniaturized connectors. There is also a tendency to bridge adjacent contacts of the connector, during the soldering operation, producing undesired circuit connections.

The conventional soldered connection has long been recognized as requiring improvement or replacement. One alternative, gaining increasing acceptance, entails the use of insulation-piercing terminals for the contact members of the connector; these terminals cut through the insulation and establish an electrical connection to the conductor without preliminary stripping and without the conventional soldering step. The insulation-piercing terminals are usually of forked construction, with cutting edges that penetrate the wire insulation and that also serve as contact jaws that make the necessary electrical connection with the conductor. That is, a forked terminal element on the connector contact serves both as an insulation cutting device and as an electrical contact.

These forked insulation-cutting contacts have a number of disadvantages. Because the contact jaws must be sharp enough to pierce and penetrate the insulation, there is a substantial tendency to cut into the conductor, particularly the individual fragile members of a stranded wire conductor, thereby, weakening the conductor and sometimes disrupting current flow, by disturbance of the skin effect, in high frequency applications. In cutting contact jaws of this kind, the jaws do not open up to the size of the conductor diameter and do not apply an evenly distributed surface pressure to the conductor. Instead, the jaw spacing remains relatively constant, emphasizing scoring of the conductor which may lead to a broken conductor if the connector is subject to vibration in use, and failing to provide the sliding friction between the conductor and the contact jaws that affords optimum electrical contact. The scored part of the conductor is particularly susceptible to corrosion. Moreover, the usual forms of forked insulation-piercing contacts do not provide positive means for keeping the conductors in place, but require separate retainers.

SUMMARY OF THE INVENTION

It is a principal object of the present invention, therefore, to provide a new and improved unitary contact member that incorporates a terminal structure which permits direct insulation-piercing connection to an electrical conductor without engendering the difficulties and disadvantages of previously known devices of this general kind.

A particular object of the invention is to provide a new and improved insulation-piercing terminal element, formed as a part of a unitary sheet metal contact member for an electrical connector, that does not cut into the electrical conductor to an appreciable extent when a connection is made.

Another object of the invention is to provide a new and improved unitary contact member for an electrical connector, formed from a single piece of thin, conductive sheet metal, that effectively pierces and penetrates the insulation on a conductor and that also provides a sliding friction contact, in engaging the conductor, once the insulation has been penetrated.

Another object of the invention is to provide a new and improved insulation-piercing terminal element for an electrical connector contact member of the kind constructed from a single piece of thin conductive sheet metal that is inherently strong and rugged and capable of withstanding several insertions and removals of an electrical conductor in changing connections to the contact member.

A further object of the invention is to provide a new and improved electrical connector, of the kind using individual sheet metal contacts mounted in mating dielectric contact mounts, that affords effective retaining means for holding individual electrical conductors in engagement with insulation-piercing terminal elements formed integrally with the contact members.

A specific object of the invention is to provide a new and improved unitary sheet metal contact member for a multi-circuit electrical connector that is inherently simple and inexpensive in construction, yet provides for optimum electrical qualities and mechanical qualities in the completion of solderless electrical terminal connections.

Accordingly, the invention relates to a unitary contact member, formed from a single piece of thin, conductive sheet metal, for an electrical connector of the kind comprising a first dielectric contact mount and a second dielectric contact mount each having a plurality of contact mounting passages, the two contact mounts fitting together to align the inner ends of the contact passages in the first mount one-for-one with the inner ends of the contact passages in the second mount. The contact member comprises an active contact element, positioned in the inner end of a given passage in one mount, for engaging a mating active contact element positioned in the inner end of the aligned passage in the other mount. The contact member further comprises an integral terminal element, comprising an elongated channel of U-shaped cross-sectional configuration, positioned in the outer end of the passage. The terminal element includes at least one terminal flange struck from a wall of the channel and bent inwardly to extend transversely of the channel, the flange having an upwardly opening notch for receiving an insulation-covered electrical conductor. The upper portion of the notch has thin edges which converge downwardly to afford a cutting section for shearing through the insulation on the conductor. The medial portion of the notch has gradually thickened edges constituting a transition section for spreading the insulation on the conductor. The lower portion of the notch has smooth, thick edges free of cutting edges and generally curved affording a pressure jaw terminal section engaging the electrical conductor in wiping contact.

An electrical connector for interconnecting a plurality of electrical circuits, in accordance with the invention, comprises a first contact mount and a second contact mount, each formed of molded dielectric material and each having a plurality of contact mounting passages extending therethrough; the two contact mounts fit together to align the inner ends of the contact passages in the first mount one-for-one with the inner ends of the contact passages in the second mount. The outer end of each contact passage is of elongated U-shaped configuration. A plurality of unitary contact members, each formed from a single piece of thin, conductive sheet metal, are included in the connector, one contact member mounted in each contact passage. Each contact member includes an active contact element positioned in the inner end of the contact passage and an integral terminal element disposed within the outer end of the contact passage. The terminal element of each contact member comprises an elongated channel smaller in width than the width of the outer end of the contact passage and includes at least one terminal flange extending transversely of the channel and having an insulation-piercing notch for receiving an insulation-covered electrical conductor and completing an electrical connection between the conductor and the contact member. Resilient retention means, molded integrally with each contact mount, are provided for releasably retaining the individual electrical conductors in the terminal elements of the contact members.

BRIEF DESCRIPTION OF THE DRAWINGS

FIG. 1 is a plan view of the plug member of an electrical connector constructed in accordance with the present invention;

FIG. 2 is a side elevation view of the plug member illustrated in FIG. 1;

FIG. 3 is a side elevation view of a receptacle member for an electrical connector constructed in accordance with the present invention;

FIG. 4 is a bottom view of the receptacle member illustrated in FIG. 3;

FIG. 5 is a transverse sectional view, on an enlarged scale, of the plug and receptacle members of FIGS. 2 and 3, aligned for joining with external wire connections;

FIG. 17 is a side elevation view of the terminal element for a contact member constructed in accordance with an additional embodiment of the invention;

FIG. 18 is a front elevation view of the terminal element illustrated in FIG. 17;

FIG. 19 is an orthagonal projection of the terminal element illustrated in FIGS. 17 and 18;

FIG. 20 is an orthagonal projection illustrating a limited modification of the construction shown in FIGS. 17–19.

DESCRIPTION OF THE PREFERRED EMBODIMENTS

Figure 6:
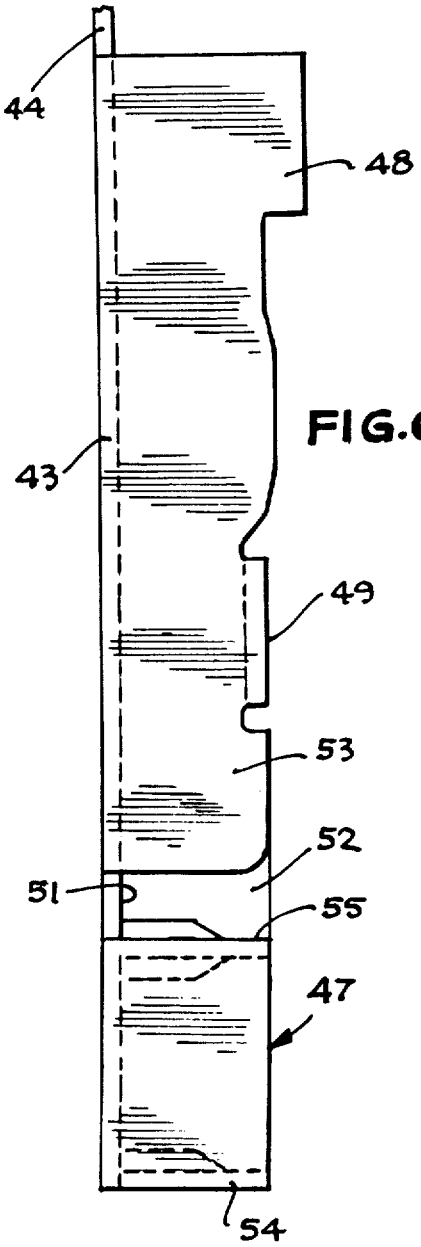
FIG. 6 is a side elevation view, drawn to a much larger scale than preceding figures, of the terminal element of a contact member constructed in accordance with one embodiment of the invention.

FIGS. 1–5 illustrate the basic structure of an electrical connector constructed in accordance with one embodiment of the present invention. The electrical connector comprises a plug unit 30, shown in FIGS. 1, 2 and 5, and a receptacle unit 40 illustrated in FIGS. 3, 4 and 5. Plug unit 30 includes a first contact mount 31 of molded dielectric material having a plurality of individual contact mounting supports or passages 32; passages 32 extend completely through mount 31, as best shown in FIG. 5. Plug unit 30 further includes a corresponding plurality of contact members 33, each of the contact members 33 being mounted in one of the contact passages 32 (FIGS. 2 and 5). Each contact member 33, as shown in some detail in FIG. 5, includes an active contact element 34 comprising a thin, flat, resilient metal element bent into a re-entrant hook configuration at the end 35 to engage in a small retaining slot 36 formed in mount 31 adjacent the inner end of passageway 32. Contact member 33 further comprises an integral terminal element 37 which is positioned in the outer end of the contact passage 32 which has an upper longitudinal side open for receiving the insulation covered electrical conductor. Contact member 33 is held in contact passage 32 by retainer elements 38 and 39, element 39 constituting a tab that is bent up to a retaining position as shown in FIG. 5 after the contact member has been inserted into passage 32.

The construction of receptacle unit 40 (FIGS. 3–5) is similar to but complementary to plug unit 30. Thus, receptacle 40 comprises a contact mount 41 of molded dielectric material having a plurality of contact passages 42 corresponding in number and position to the contact passages 32 in mounting block 31 and are arranged in two parallel rows 70 and 71 as shown in FIGS. 3–4. In the illustrated connector, FIGS. 1–5, there are fifty contacts in each of the connector halves 30 and 40; this number may vary substantially, depending on the number of circuits to be interconnected.

A unitary conductive sheet metal contact member 43 is mounted in each contact passage 42 of receptacle mount 41. Each contact member 43, as shown in FIG. 5, comprises a flat resilient active spring contact member 44 bent over at its inner end 45 to fit into a small retaining slot 46 in mounting block 41. The outer portion of contact member 43 comprises a terminal element 47.

Each contact member 43 is held in position in its contact passage 42 in mounting block 41 by means of appropriate retainer elements 48 and 49 (FIG. 5).

As thus far described, and as illustrated in FIGS. 1–5, the construction of the connector comprising plug unit 30 and receptacle unit 40 is essentially similar to the multiple-contact electrical connector described and illustrated in Yopp U.S. Pat. No. 3,002,176. The individual contact members 33 can be readily and rapidly mounted in the plug mounting block 31 by inserting the contact members in the individual contact passages 32 and then bending each of the retaining tabs 39 outwardly to lock the contact members in place. The same technique is followed in assembling the contact members 43 in contact passages 42 in the mount 41 of receptacle unit 40.

When the two connector units are joined, as by moving plug unit 31 downwardly in the direction of arrow A in FIG. 5, the active contact element 34 on each plug contact member 33 engages the active contact element 44 of the corresponding contact member 43 in the receptacle unit. The yielding active contact elements of each mating pair of contact members afford dependable engagement and adequate contact pressures, without overflexing of either contact in the pair. The specific design shown for the contact elements allows the use of metals, in fabrication of the contact elements, of relatively low spring quality and high electrical conductivity, affording a connector that is small in size yet adapted to normal voltages and currents used for data communication. The mating contact surfaces are maintained clean and bright and the connector joins with a snap-in action. In actual practice, plug unit 30 and receptacle unit 40 are each usually provided with a metal housing for increased strength and protection; the housings have been omitted from the drawings because they are not critical to the present invention.

In the electrical connectors of the aforementioned Yopp patent, the terminal elements of the individual contact members are of channel-shaped configuration, and electrical connections to individual conductors are effected by conventional solder techniques. For the contact members 33 and 43 of the present invention, however, soldering is not employed. That is, the unitary contact members 33 and 43, each formed from a single piece of thin conductive sheet metal, include provision for solderless insulation-piercing connection to an insulated electrical conductor simply by insertion of the electrical conductor into the terminal element of the contact member.

Figure 7:
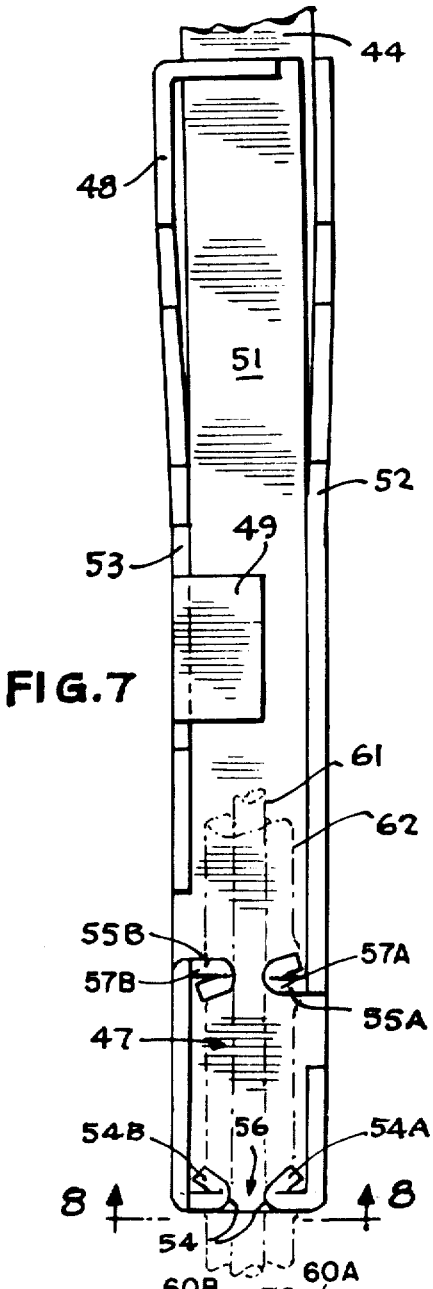
FIG. 7 is a front elevation view of the contact member of FIG. 6, with an external wire connection.
Figure 8:
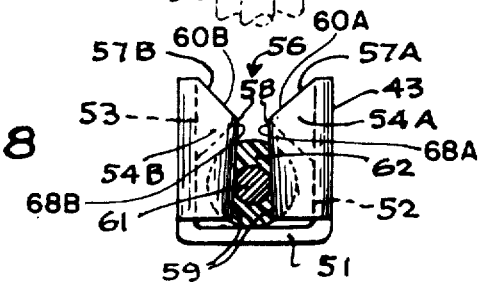
FIG. 8 is an end view taken approximately along line 8—8 in FIG. 7, with the wire in cross section.
Figure 9:
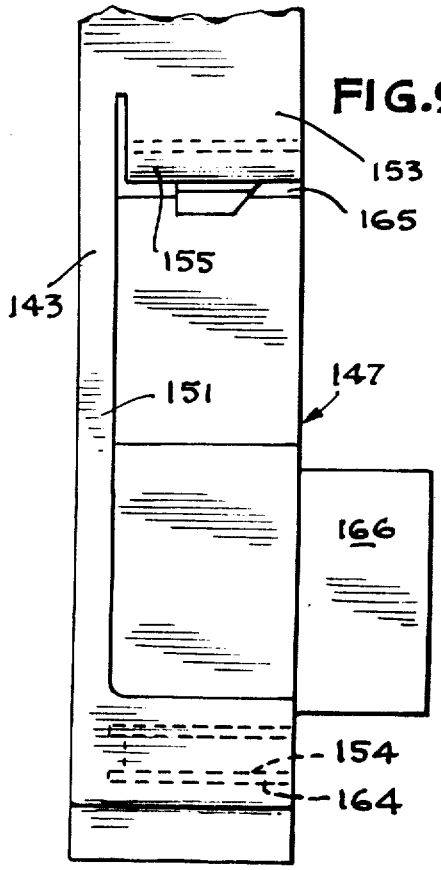
FIG. 9 is a side elevation view, on an enlarged scale of the terminal element of a contact member constructed in accordance with another embodiment of the invention.

FIGS. 6, 7 and 8 illustrate, on a greatly enlarged scale, one construction that may be employed, in accordance with the present invention, for the terminal element 47 formed at the outer end of each of the contact members 43. It should be noted that, in this specification, the term "outer end," as applied to either a contact member or a contact passage in the electrical connector, refers to the portion of the connector to which individual external electrical conductors are connected. It will be recognized that the configuration of the connector can be changed so that the terminal elements of the contact members are not linear extensions of the active contact elements, without changing this relationship.

The outer end of contact member 43, comprising terminal element 47, as shown in FIGS. 6–8, comprises an elongated channel of U-shaped cross sectional configuration having a channel-forming walls illustrated by bottom wall 51 and side walls 52 and 53. The retainer tab 49 is formed integrally with side wall 53. Tab 49 is shown in its initial position, bent over at approximately 90° to the top of side wall 53, this being the initial position of the tab when contact member 43 is inserted in the dielectric mount 41. Once the contact is in place in the dielectric mount, tab 49 is bent outwardly to the retaining position shown in FIG. 5.

Terminal element 47 of contact member 43 includes two terminal flanges 54 and 55. Flange 54 is formed by two opposed transverse flange elements 54A and 54B struck from side walls 52 and 53 respectively. The two flange elements 54A and 54B are bent inwardly across the end of the channel constituting terminal element 47, forming an upwardly opening notch 56 (FIGS. 7 and 8). The upper portion of notch 56 has downwardly converging thin-edges walls 57A and 57B (FIG. 8) that afford a cutting section for shearing through the insulation on an insulated electrical conductor. The medial portion of notch 56 has gradually thickened edges, constituting a transition section 58, for spreading the insulation away from a conductor inserted in the notch. The lower portion of notch 56 has smooth, rounded edges along its walls that afford a terminal section 59 constituting a pressure jaw that engages an electrical conductor in wiping contact.

The second terminal flange 55 of terminal element 47 (FIGS. 6 and 7) is similar in construction to flange 54. It includes a first flange element 55A struck from channel wall 52 (FIG. 7) and bent inwardly across the channel. A second flange element 55B is struck from wall 3 and bent inwardly across the channel in alignment with flange element 55A. Both of the flange elements are formed with sloping upper walls and are bent back upon each other to afford a cutting section, a transition section, and a terminal section as described for flange 54 (FIGS. 7 and 8).

To complete an electrical connection to terminal element 47, a metallic conductor 61 with an electrical insulation covering 62 is inserted into the two notches in the terminal flanges 54 and 55 as generally indicated in FIG. 7. As the insulated conductor is forced downwardly into the notches in the two terminal flanges, the converging notch walls, such as the walls 57A and 57B (FIG. 8), cut into the insulation on the conductor in a shearing action similar to that performed by conventional insulation-piercing terminal elements. As the conductor is forced further downwardly beyond lower ends 60A and 60B of thin-edged walled 57A and 57B hand into notch 56 in flange 54, it enters the transition section 58. As illustrated in FIG. 8, transition section 58 is disposed at the upper ends 68A and 68B or entrance to lower transition section 58 and separates transition section 58 from the lower ends 60A and 60B of the thin flat cutting edges of walls 57A and 57B. The gradually thickened walls for the notch beginning at transition section 58, tend to spread the insulation. The lower folded portions of the notch walls, in the lower terminal section 59, engage the conductor 61 without cutting into it and apply a full normal force in sliding friction contact with the conductor. In FIG. 8, the final position of an electrical conductor 61 with an insulating cover 62 is shown in notch 56 of terminal flange 54, with the electrical connection completed and with insulation 62 substantially disposed within the channel. The same action occurs at flange 55.

FIGS. 9–11 and 13 illustrate another embodiment of the present invention, comprising a terminal element 147 formed as an integral part of a unitary sheet metal contact member 143. Only the terminal element is illustrated, the active contact element may correspond to the contact element 44 of FIG. 5. Terminal element 147 is of elongated channel-shaped construction with a bottom wall 151 and side walls 152 and 153. At the outer end of the terminal element, a portion of side wall 152 is bent across the channel to afford a first terminal flange 154. A second terminal flange 155 is struck from the other side wall 153 and is bent inwardly to extend across the channel at a location spaced from the outer terminal flange 154.

Figure 11:
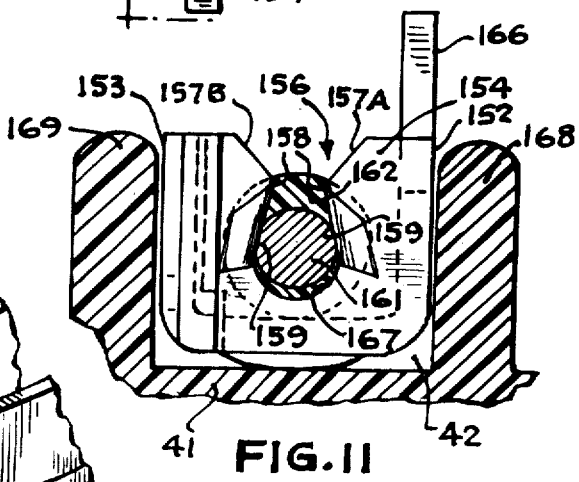
FIG. 11 is an end view taken approximately along line 11—11 in FIG. 10, with a part of the dielectric contact mount and a part of an external conductor also illustrated.

Terminal flange 154 is provided with an upwardly opening notch 156 for receiving an insulation covered electrical conductor such as the conductor 161 with its insulation 162 (FIG. 11). The upper portion of notch 156 includes the thin, downwardly converging notch walls 157A and 157B. The thickness of walls 157A and 157B in the upper portion of notch 156 is limited to the thickness of the sheet metal from which terminal element 147 is formed, usually of the order of 0.005 inch and forms thin flat cutting surfaces 170A and 170B (FIG. 13) facing into the notch and extending across at least a major portion of the thickness of sheet metal providing walls 157A and 157B. Thus, the upper portion of notch 156 affords a cutting section for shearing through the insulation 162 on conductor 161.

The medial portion of notch 156 is bent away from the notch and is coined or swedged to afford gradually thickened edges constituting a transition section 158. Transition section 158 spreads the insulation on conductor 161 as the conductor is progressively inserted into notch 156. The lower portion of notch 156 has smooth, thick edges affording a terminal section 159 having portions of multiple thickness forming thickened edges and constituting a pressure jaw that engages the electrical conductor 61 in a smooth wiping friction contact that affords a good electrical connection between conductor 161 and terminal flange 154.

Figure 10:
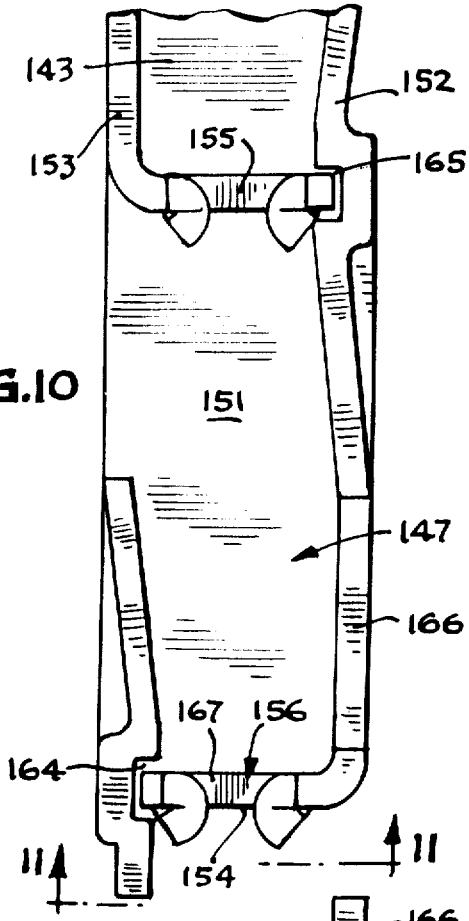
FIG. 10 is a front elevation view of the contact member of FIG. 9.
Figure 13:
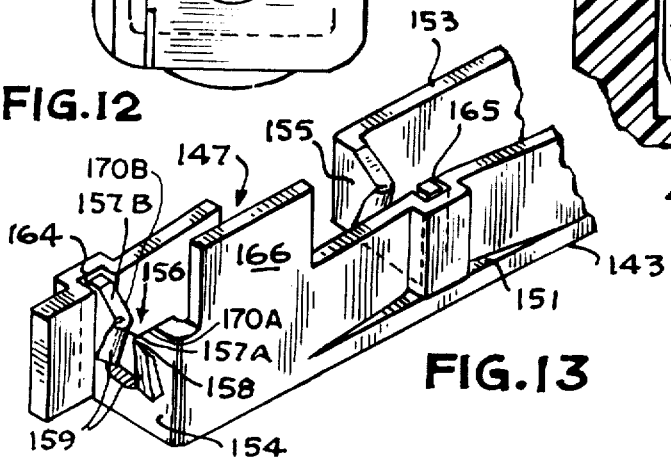
FIG. 13 is an isometric view, on a reduced scale, of the contact member terminal element of FIGS. 9–11.

Terminal flange 155 is essentially similar to flange 154, as best shown in FIGS. 10 and 13. That is, the second terminal flange 155 is constructed with a notch for receiving an insulation-covered electrical conductor, the upper portion of the notch having thin, downwardly converging edges that afford a cutting section and that merge into a medial portion of the notch having gradually thickened edges. The bottom portion of the notch in terminal 155, as in flange 154, has smooth, rounded, thickened edges that provide a terminal section constituting a pressure jaw for engaging the electrical conductor in good electrical contact.

In the construction illustrated in FIGS. 9–11 and 13, the end portion of channel wall 153 adjacent terminal flange 154 is bent inwardly and shaped to afford a slot 164. Similarly, a part of channel wall 152 aligned with terminal flange 155 is deformed inwardly and pressed into a configuration that provides a vertically extending retainer slot 165. In terminal element 147, the free end of flange 154 engages in slot 164 to brace the flange and prevent the flange from being bent out of position when completing an electrical connection to a conductor inserted into the flange. The retaining slot 165 in channel wall 152 serves the same purpose, strenthening flange 155 mechanically and preventing deformation of the flange when an electrical conductor is inserted into terminal 147.

Terminal element 147 also includes a retainer tab 166 that is formed integrally with and that extends upwardly from the one side wall 152 of the channel. Retainer tab 166 remains in the illustrated position until a conductor has been inserted in terminal element 147 and electrical connection has been established. Once this has been done, tab 166 can be bent over to engage the outer surface of the electrical conductor and hold the insulated conductor in the terminal element 147.

In the end view of FIG. 11, the side walls of notch 156, particularly in the terminal section 159 of the notch, are shown as diverging slightly, with the bottom of the notch terminating in a rounded lower wall 167. Thus, the walls of the conductor-receiving notch 156 apply a limited clamping force to conductor 161, holding the conductor in the notch and in electrical contact with terminal flange 154. With this construction, notch 156 is formed apart slightly as conductor 61 passes through the transition section 158 and into the terminal section 159 of the notch. To prevent excessive distortion and assure effective operation of terminal element 147 the overall width of terminal element 147 is made only slightly smaller than the spacing between the two walls 168 and 169 defining this portion of the contact passage 42 in the molded dielectric mounting block 41 (FIG. 11). Thus, there is a close fit (0.001 inch typical clearance) between the walls 168 and 169 of passage 42 and terminal element walls 152 and 153; this prevents undue spreading of terminal element 147 when an insulated conductor is inserted in the terminal flange notches.

Figure 12:
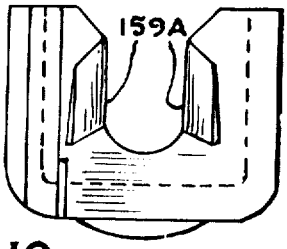
FIG. 12 is an end view, similar to FIG. 11, illustrating a modification in the construction of the terminal element of FIGS. 9–11.

It is not essential that the walls of the terminal flange notches be made divergent, in the terminal section, in the manner shown in FIG. 11. The notch walls may be maintained parallel throughout the transition section and the terminal section. This is particularly true when other means such as the retaining tab 166, are provided for holding the electrical conductor in the terminal flanges. Thus, the walls of the terminal section may be made parallel to each other, as shown in terminal section 159A, illustrated in FIG. 12.

Figure 14:
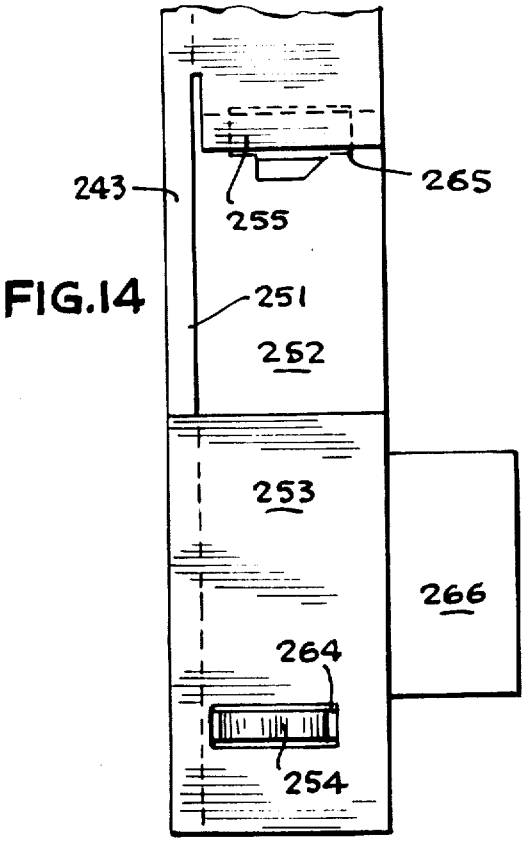
FIG. 14 is a side elevation view of the terminal element of a contact member constructed in accordance with another embodiment of the invention.
Figure 15:
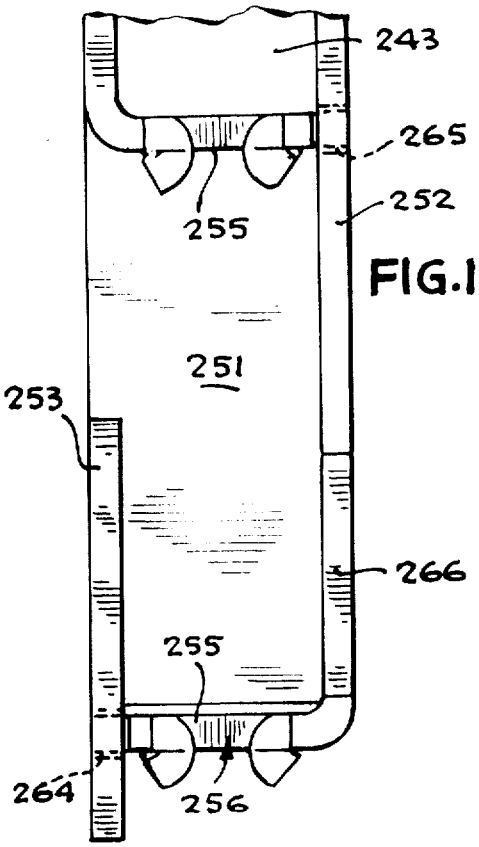
FIG. 15 is a front elevation view of the terminal element illustrated in FIG. 14.
Figure 16:
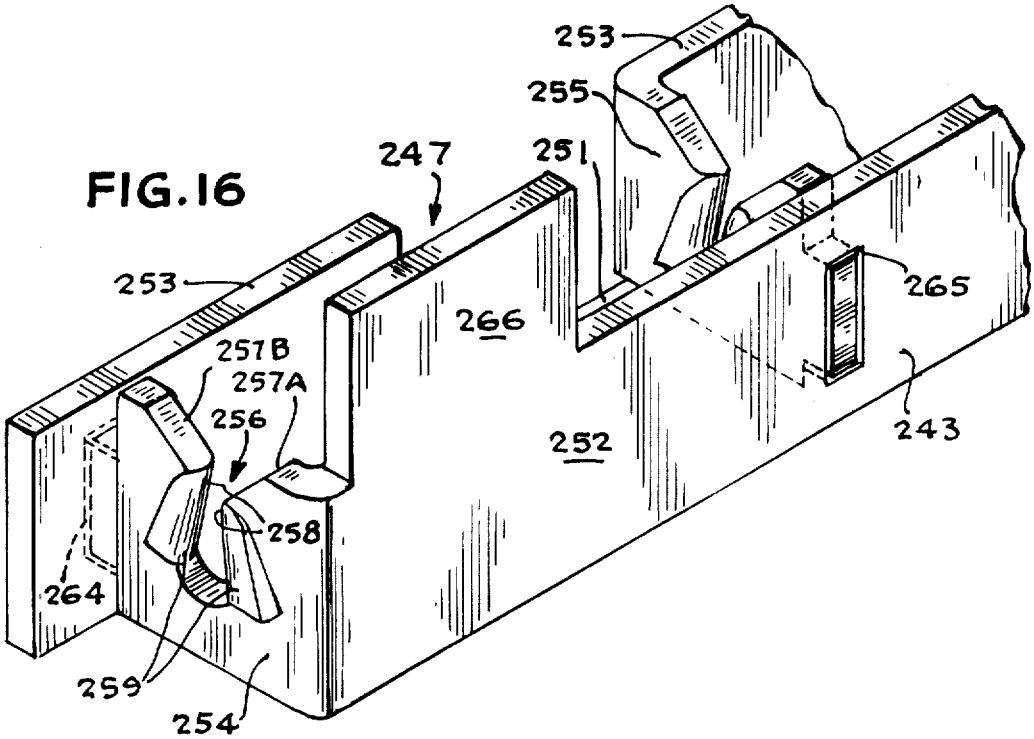
FIG. 16 is an isometric projection of the terminal element of FIGS. 14 and 15.

FIGS. 14, 15 and 16 illustrate a terminal element 247, constructed in accordance with another embodiment of the invention, and constituting an integral part of a sheet metal contact member 243. The active contact element of member 243 may have the same construction as discussed above in connection with FIG. 5, and hence has not been illustrated. Terminal element 247 is of U-shaped cross sectional configuration, forming an elongated channel having a bottom wall 251 and side walls 252 and 253. At the outer end of the channel, a first terminal flange 254 is struck from an extension of side wall 252 and is bent across the channel to form a first terminal flange 254. A second terminal flange 255 is struck from the other side wall 253 and is bent across the channel in spaced relation to flange 254. Flange 254 includes an extension portion that is inserted into a retainer slot 264 in side wall 253, bracing the free end of flange 254 and thus affording a rigid construction for the flange. Similarly, an extension at the end of flange 255 projects into a retaining slot 265 cut into channel wall 252, affording a retaining structure for the free end of flange 255 and thus providing a rigid mechanical construction.

The two flanges 254 and 255 in terminal element 247 are similar in configuration to the flanges 154 and 155 of terminal element 147 (FIGS. 9–11 and 13). Thus, as shown in FIG. 16, flange 254 has a conductor-receiving notch 256 with thin, downwardly converging edges 257A and 257B forming a cutting section for shearing through the insulation on an insulated conductor inserted into slot 256. The cutting section of notch 256 merges with a transitional section 258 having gradually thickened edges that serves to spread the insulation when a conductor is inserted in notch 256. The lower portion 259 of notch 256 has thick rounded edges, terminating in a rounded lower wall, affording a pressure jaw for gripping the conductor and completing an electrical connection therewith when the insulated conductor is inserted in notch 256. A corresponding construction is provided for an insulation-piercing electrical connection notch formed in terminal flange 255. As before, a retainer tab 266 may be incorporated in terminal element 247. After an electrical conductor has been inserted into terminal element 247, tab 266 can be bent over to a position in which it extends across the open side of the channel and locks the conductor into the channel. The notches in terminal flanges 254 and 255 may have divergent walls in their transition and terminal sections, as in FIG. 11, or may have parallel walls in these sections, as in FIG. 12.

FIGS. 17, 18 and 18 illustrate yet another embodiment of the terminal element of the present invention, comprising a terminal element 347 formed integrally with and constituting a part of a one-piece sheet metal contact member 343. Terminal element 347 is again of U-shaped channel construction, including a bottom wall 351 and side walls 352 and 353. A first terminal flange 354 is formed as a part of bottom wall 351 and is bent upwardly so that the flange extends across the outer end of the channel. Similarly, a second terminal flange 355 is struck from the bottom wall 351 of the channel and is bent upwardly so that the flange extends across a medial portion of the channel, spaced from flange 354. The ends of flange 354 are formed with individual projections that engage in two slots 364A and 364B in the channel walls 352 and 353, respectively. Similarly, flange 355 has an extension on each end, and these extensions are engaged in slots 365A and 365B in the side walls 352 and 353, respectively. As will be apparent from FIG. 19, this forms a strong, rigid construction for the terminal flanges, preventing excessive distortion when an electrical conductor is inserted in terminal element 347.

Terminal flange 354 includes a notch 356 affording an effective insulation-piercing terminal connection for an insulated wire inserted in the notch. The configuration for notch 356 is similar to the notch constructions described above. Thus, the connection notch 356 in flange 354 opens upwardly of the channel and has thin, downwardly converging edges 357A and 357B forming a cutting section for piercing and penetrating the insulation of a wire inserted in the notch. The cutting section merges with a transition section 358 with gradually thickening edges that spread the insulation. The lower portion of notch 356 has smooth, thickened walls, formed by swedging or coining the bent portions of the flange, that constitute an effective pressure jaw connector 359 that engages the conductor in firm sliding contact to afford a good electrical connection. A similar construction is used for an insulation-piercing electrical connector notch formed in terminal flange 355.

Th construction of terminal element 347 (FIGS. 17–19) may also be modified to utilize retaining notches for the terminal flanges that are formed by bending the side walls 352, 353 rather than being cut into the side walls. This modification is illustrated in FIG. 20, as applied to terminal flanges 354. In the construction shown in FIG. 20, the end portion of side wall 352 is formed to afford a vertically extending slot 364C. A similar vertical slot 364D is formed by bending an aligned portion of wall 353 in the same manner. This affords an alternate means for achieving the requisite mechanical rigidity and strength in the terminal flange construction to prevent excessive distortion when an electrical connection is made. In the terminal element constructions shown in FIGS. 17–20, a retaining tab 366 may again be provided to lock a conductor in place once it is inserted in and electrically connected to the terminal flanges.

Figure 21:
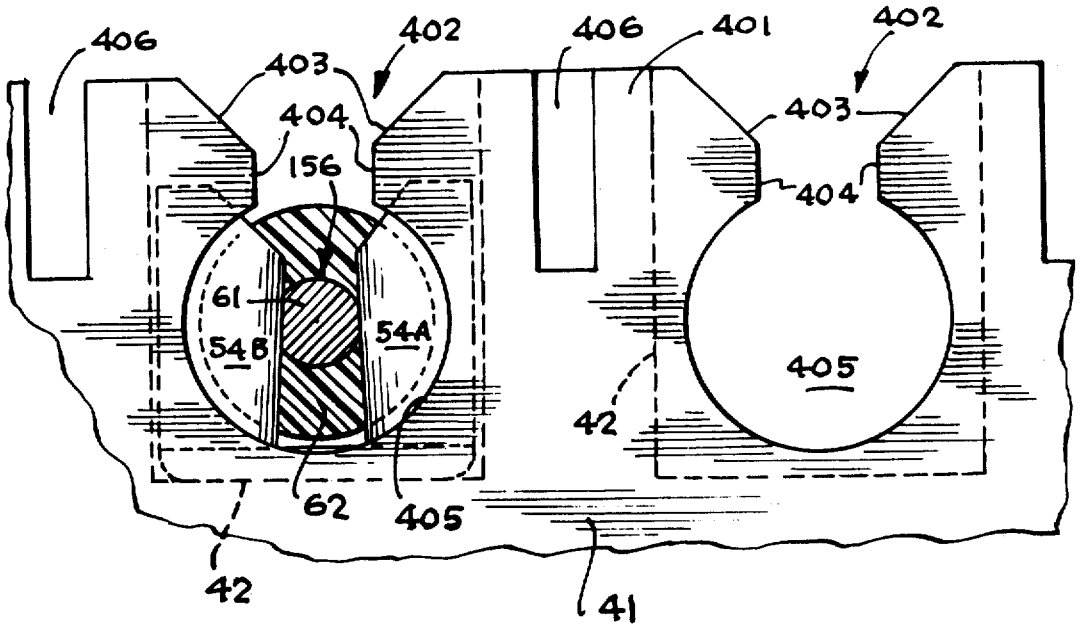
FIG. 21 is a detail illustration of a part of the electrical connector receptacle shown in FIG. 3, taken approximately as indicated by line 21—21 therein.

In some instances, it may be desirable to eliminate the retainer tab on the contact member (tabs 66, 166, 266 and 366) or to provide supplemental retainer means for the electrical conductors. FIG. 21, considered in conjunction with FIGS. 2 and 3, illustrates a conductor retainer structure that is incorporated in the receptacle unit 40 as a part of the dielectric contact mount 41 as another feature of the invention.

As shown in FIGS. 3 and 21, mount 41 includes an integral molded barrier 401 extending across the outer ends of all of the contact passages 42. Barrier or rear extension 401 includes a plurality of retainer grooves 402, a groove 402 aligned with and communicating with the end of each passage 42. Each groove is arranged for receiving conductor blank 402 includes a downwardly converging entrance section 403 leading into a short, narrow retainer section 404 that in turn leads into a wide retainer section 405 slightly larger than the overall diameter of a conductor 61 and its insulator covering 62. Barrier 401 may also have a series of slots 406 in the walls therein adjacent retainer grooves 402, facilitating flexing of the retainer groove walls.

When an insulated conductor is connected to one of the contact member terminals, using the construction shown in FIG. 21, the conductor is forced down through entrance section 403 and retainer section 404 and into receptacle section 405 of retainer groove 402. The final alignment of the conductor 61 and insulator covering 62 is shown in FIG. 21; conductor 61 is gripped in the notch between flange elements 54A and 54B as described above for FIGS. 6–8. In addition, after passing through retainer section 404, the insulated conductor is firmly held in place in receptacle 405. During insertion, the walls of groove 402 spread, particularly in section 404, then snap back into the illustrated retention position holding conductor 61 in longitudinal alignment with the notch formed by flange elements 54A and 54B of terminal element 47.

In the foregoing description, the terminal elements for contact members used in the receptacle unit 40 have been described in detail. The contact members for plug unit 30 can be constructed in the same manner, using any of the configurations shown in FIGS. 6 through 20, and the plug unit contact mount 31 can be molded to afford the same kind of resilient retention means as shown in FIG. 21. In both connector units, the terminal elements of the invention provide for rapid solderless connection of external conductors, minimizing or eliminating the scoring of conductors present in other insulation-piercing connections and providing sliding friction contact at adequate pressure levels. The terminal elements can be used, even in miniaturized connectors, at voltages of several hundred volts, and can carry several amperes of current. The conductors are held firmly in the terminal elements, by their retainer tabs, by the retainer grooves in the contact mounts, by the terminal flange jaws, or by a combination thereof. The contact members of the invention can be used in two-unit connectors, as described in conjunction with FIGS. 1-5; a single connector unit, incorporating the advantageous features of the invention, can also be used with a mating connector unit of different construction. Thus, the receptacle unit 40 can be employed, with little or no modification, in making circuit connections to a mating connector comprising a part of a printed circuit board.

I claim:

1. A unitary contact member formed from a single piece of thin, conductive sheet metal, comprising:

an active contact element;

and an integral terminal element, comprising side and bottom walls forming an elongated channel of U-shaped cross-sectional configuration with inner and outer end portions, said terminal element including at least one terminal flange, formed by at least one flange element struck from one of said walls of said channel and bent to extend transversely of said channel, said flange extending completely across said channel and interlocked with at least one other wall of said channel, said flange having an upwardly open notch for receiving an insulation-covered electrical conductor, the upper portion of said notch converging downwardly and having thin edges to afford a cutting section for shearing through the insulation on the conductor, the medial portion of said notch having gradually thickened edges constituting a transition section for spreading the insulation on the conductor, and the lower portion of said notch having smooth, curved thickened edges affording a terminal section with a resilient pressure jaw engaging the electrical conductor in wiping contact.

2. A unitary contact member, according to claim 1, in which said terminal element includes two of said terminal flanges and inner and outer end portions, one terminal flange being located adjacent the outer end portion of said terminal element and the other terminal flange being located adjacent the inner end portion of said terminal element, each terminal flange having a conductor-receiving notch affording said cutting, transition, and terminal sections.

3. A unitary contact member, according to claim 1 in which said terminal flange is struck from one of said side walls of said channel, extends completely across said channel, and projects into a retaining slot in the other side wall of said channel.

4. A unitary contact member, according to claim 1, in which said terminal flange is struck from the bottom wall of said channel and projects into retaining slots in both side walls of said channel.

5. A unitary contact member, formed from a single piece of thin, conductive sheet metal, comprising:

an active contact element;

and an integral terminal element, comprising side and bottom walls forming an elongated channel of U-shaped crosssectional configuration with inner and outer end portions;

said terminal element including at least one terminal flange, formed by at least one flange element struck from one of said walls of said channel and bent to extend transversely of said channel, said flange having an upwardly open notch for receiving an insulation-covered electrical conductor, the upper portion of said notch converging downwardly and having thin edges to afford a cutting section for shearing through the insulation on the conductor, the medial portion of said notch having gradually thickened edges constituting a transition section for spreading the insulation on the conductor, and the lower portion of said notch having smooth, curved thickened edges affording a terminal section with a resilient pressure jaw engaging the electrical conductor in wiping contact, said transition and terminal sections of each terminal flange notch being formed by flaps folded away from the center of the notch and coined or swedged into the recited shape at said transition section.

6. A unitary contact member, according to claim 5, in which the terminal section of said terminal flange notch has downwardly diverging walls which are spread during insertion of an electrical conductor and which apply a retaining force to hold the conductor in said notch.

7. A unitary contact member according to claim 5, in which the side walls of the terminal section of said terminal flange notch terminate in a smooth, arcuate bottom wall.

8. A unitary contact member, formed from a single piece of thin, conductive sheet metal, for an electrical connector of the kind comprising a first dielectric contact mount and a second dielectric contact mount having a plurality of contact mounting passages, the two contact mounts fitting together to align the inner ends of the contact passages in the first mount one-for-one with the inner ends of the contact passages in the second mount, said contact member comprising:

an active contact element for positioning in the inner end of a given passage in one mount and for engaging a mating active contact element positioned in the inner end of the aligned passage in the other mount; and an integral terminal element, comprising an elongated channel of U-shaped cross-sectional configuration for positioning in the outer end of said given passage, said terminal element including at least one integral terminal flange struck from one wall of said channel, said flange extending completely across said channel, and being interlocked with at least one other wall of said channel, said flange having an upwardly opening notch for receiving an insulation-covered electrical conductor, said notch having a upper portion converging downwardly and having thin edges to afford a cutting section for shearing through the insulation on the conductor, a medial portion of said notch having gradually thickened edges constituting a transition section for spreading the insulation on the conductor, and a lower portion of said notch having smooth, thickened edges affording a terminal section with a resilient pressure jaw engaging an electrical conductor in wiping contact.

9. A contact member for interconnection to an insulation-covered electrical conductor, comprising a longitudinally extending terminal element formed of thin, conductive sheet metal with at least one pair of opposed, transverse flange elements forming an upwardly open notch for receiving said conductor, said notch including an upper portion having thin flat edges converging downwardly to afford an insulation cutting section with said thin flat edges extending across at least a major portion of a thickness of said sheet metal, a lower portion having smooth, curved, thickened edges to afford a conductor engaging terminal section, and an insulation-spreading medial portion between said upper and lower portions with edges having a thickness greater than the thickness of said thin edges, said flange element including portions of multiple thicknesses of said sheet metal, said thin sheet metal being bent to form said thickened edges, and said thickened edges being resiliently spread during insertion of the electrical conductor and bearing against the conductor in pressure engagement.

10. A contact member according to claim 9 including an active element for connection to a circuit element and in which said terminal element includes a pair of said notches with said notches being longitudinally displaced and having upper ends forming an entrance to said lower portion, and an insulation-spreading medial portion between said upper and lower portions with edges having a thickness greater than the thickness of said thin edges and extending to said upper ends of said lower portions.

11. A contact member according to claim 9 in which said terminal element includes walls forming a channel open to receive said conductor, with at least one of said walls integrally supporting said flange elements.

12. A contact member for interconnection to an insulation-covered metallic conductor, comprising, a longitudinally extending terminal element formed of thin, conductive sheet metal with at least one pair of opposed, transverse flange elements forming an upwardly open notch for receiving said conductor, said notch including an upper portion having thin edges converging downwardly to afford an insulation cutting section and a lower portion having smooth, curved, thickened edges to afford a conductor engaging terminal section, said flange elements including portions of multiple thicknesses of such sheet metal forming thickened edges, said thickened edges being downwardly diverging and being spread during insertion of said conductor to apply a retaining force to hold the conductor in said notch.

13. An electrical connector unit comprising: insulating means including a plurality of parallel longitudinally extending passages with inner and outer end portions each outer end portion having an upper longitudinal side open for receiving an insulation-covered electrical conductor, and a plurality of contact members mounted in said passages, including terminal elements disposed in said outer end portions, each of said terminal elements including at least one pair of opposed, transverse flange elements forming an upwardly opening notch for receiving said conductor, said notch including an upper portion having thin edges converging downwardly to afford an insulation cutting section and a lower portion having smooth, curved thickened edges to afford a conductor engaging terminal section, said flange elements being formed of thin, conductive sheet metal and including portions of multiple thicknesses of said sheet metal forming said thickened edges.

14. An electrical connector unit, according to claim 13, in which said insulating means includes:

conductor retention means including a dielectric extension disposed across the outer end portions of said contact passages, said extension including a plurality of longitudinally elongated conductor support surfaces individually aligned with individual outer end portions and means for releasably retaining the individual conductors extending longitudinally away from the passages from upward movement in a direction out of the lower terminal sections of the notches.

15. An electrical connector unit, according to claim 14, in which said end extension includes a plurality of elongated retainer grooves, one for each contact passage, each retainer groove including a wide entrance section leading to a narrow retainer section which in turns leads to a substantially wider receptacle section large enough to accommodate an insulation-covered conductor.

16. An electrical connector unit, according to claim 14, wherein said outer end portion of each of said passages is of elongated U-shaped configuration with side walls and said terminal element includes an elongated channel with said flange elements and side and bottom walls, the side walls of the terminal element affording a close fit with the side walls of the outer end of the contact passage in which the contact member is mounted, so that the insulating means prevents excessive distortion of each terminal element when a conductor is inserted in the terminal flange notch thereof.

17. An electrical connector unit, according to claim 14, in which each terminal flange is struck from one wall of said terminal element channel and bent inwardly across said channel into interlocking relation with at least one additional wall thereof.

18. An electrical connector unit according to claim 13 in which said contact members include active elements for connection to circuit elements and said notch includes an insulation-spreading medial portion between said upper and lower portions.

19. An electrical connector unit according to claim 13 in which said terminal elements include channel-forming walls of said sheet metal with at least one of said walls being integral with at least one of said flange elements, and in close fit with said insulating means to prevent excessive distortion of said terminal flange elements when said conductor is inserted in the notch thereof.

20. An electrical connector unit according to claim 19 in which said insulation of said conductor is substantially disposed within said channel.

21. An electrical connector unit according to claim 19 in which said contact members include active elements disposed in said inner end portions, said terminal elements each include a pair of said notches, even including an insulation-spreading medial portion between said upper and lower portions.

22. An electrical connector unit according to claim 13 in which said terminal element includes channel forming side walls with said pair of flange elements being disposed between said walls and integral therewith.

*23. An electrical contact member including a longitudinally extending terminal element formed of conductive sheet metal with at least one pair of opposed transversely disposed flange elements and an upwardly opening, insulation-spreading notch with a downwardly converging portion and formed by said flange elements for receiving an insulation-covered metallic conductor inserted downwardly into the notch, the notch including an upwardly disposed portion for spreading the insulation on the conductor and a lower portion with wiping surfaces for electrically engaging the conductor, said lower portion being constructed of said*

*sheet metal bent to form smooth, thickened surfaces as said wiping surfaces for engaging said conductor.*

*24. The contact member of claim 23, wherein said notch further includes a coined or swedged medial portion having gradually thickened edges constituting a transition section between said upper and lower portions.*

*25. The contact member of claim 23 wherein said terminal element includes at least one wall and said flange element includes a portion bent from said wall with an additional bend to form said thickened surface along said additional bend.*

*26. The contact member of claim 25 including said conductor disposed in said notch, said wiping surfaces extending through said insulation and providing a pressure jaw engaging said metallic conductor.*

*27. The contact member of claim 26 wherein said terminal element is constructed of said sheet metal and includes two opposed, longitudinally extending channel walls and two pairs of said flange elements with each of said pairs being separated longitudinally and each flange element being carried by one of said walls.*

*28. The contact member of claim 26 wherein at least one of said walls includes a conductor retaining tab integrally joined to one of said walls for retaining said conductor from upward movement in said terminal element.*

*29. The structure of claim 26 wherein the said curved surfaces comprise said sheet metal folded upon itself.*

*30. An electrical connector including insulating means with a plurality of parallel, longitudinally-extending passages with upwardly open portions and a plurality of contact members comprising terminal elements including channel walls of conductive sheet metal each formed with pairs of opposed flange elements and upwardly opening, insulation-piercing notches formed by said flange elements disposed in said passages for receiving insulation-covered metallic conductors, the notches including upwardly disposed portions for spreading the insulation on the conductors and lower portions with wiping surfaces for electrically engaging the conductors, said lower portions being constructed of said sheet metal bent to form smooth, thickened surfaces providing said wiping surfaces for engaging said conductors.*

*31. The connector of claim 30 wherein said sheet metal is formed in a reverse band with at least two thicknesses of said sheet metal forming said smooth, thickened surfaces along a longitudinal portion of said conductors.*

*32. The connector of claim 31 including a plurality of said conductors disposed in said notches with said wiping surfaces extending through said insulation and providing pressure jaws engaging said metallic conductors.*

*33. An electrical contact member including a longitudinally-extending terminal element formed of conductive sheet metal with at least one pair of opposed and transversely disposed flange elements and an upwardly opening notch formed by said flange elements for receiving an insulation-covered metallic conductor inserted transversely of its longitudinal axis downwardly into the notch, the notch including a lower portion with wiping surfaces for electrically engaging the conductor, said lower portion being constructed of said sheet metal bent to form smooth, thickened surfaces providing said wiping surfaces for engaging said conductor.*

*34. The contact member of claim 33 wherein said terminal element includes at least one wall and said flange element includes a portion bent from said wall with an additional bend to form said thickened surface along said additional bend.*

*35. The contact member of claim 34 including said conductor disposed in said notch, said wiping surfaces extending through said insulation and providing a pressure jaw engaging said metallic conductor.*

*36. In combination, an electrical contact member comprising a terminal element constructed of conductive sheet metal including a pair of transversely disposed and opposed pressure jaws projecting inwardly between said walls and an upwardly opening notch formed by said jaws with a portion including upwardly-extending smooth, thickened wiping surfaces, said sheet metal being bent to form said surfaces, and an insulation-covered metallic conductor disposed longitudinally in said notch, said surfaces including portions extending through said insulation and engaging said conductor.*

*37. The combination of claim 36 wherein each of said pressure jaws include a first bend of said sheet metal joined to one of said walls and a second bend providing one of said smooth, thickened wiping surfaces.*

*38. An electrical contact terminal element formed of conductive sheet metal to provide a longitudinal channel with at least one pair of opposed transversely disposed flange elements integral therewith forming an upwardly open notch for receiving a conductor of greater width than the width of said notch inserted downwardly into the notch by movement of said conductor transversely of its own longitudinal axis, the flange elements each including a portion with a wiping surface for electrically engaging and maintaining engagement with the conductor, said flange elements being deformed from said sheet metal to provide a smooth curved surface having an axis of curvature transverse to the longitudinal axis of the conductor and providing said wiping surface.*

*39. The structure of claim 38 wherein said sheet metal has a thickness substantially thinner than the notch with respect to said longitudinal axis of said conductor.*

*40. The structure of claim 38 wherein said curved surface comprise the side walls of the channel deformed inwardly.*

*41. In combination, an electrical contact terminal element formed of conductive sheet metal to provide a longitudinal channel with at least one pair of opposed transversely disposed pressure jaws integral therewith and having opposed conductor engaging wiping surfaces forming a notch; and an insulated metallic conductor with exposed metallic portions intermediate insulated portions thereof maintained in pressure engagement with said wiping surfaces in said notch, said pressure jaws each being deformed from said sheet metal to provide a smooth curved surface having an axis of curvature transverse to the longitudinal axis of the conductor for engaging said conductor and providing said wiping surface.*

* * * * *